United States Patent [19]

Hill

[11] 4,248,8

[45] * Feb. 3, 19

[54] PRODUCTION OF STABILIZED WET PROCESS PHOSPHORIC ACID

[75] Inventor: Richard N. Hill, Lakeland, Fla.

[73] Assignee: W. R. Grace & Co., New York, N.Y.

[ * ] Notice: The portion of the term of this patent subsequent to Aug. 29, 1995, has been disclaimed.

[21] Appl. No.: 54,446

[22] Filed: Jul. 3, 1979

Related U.S. Application Data

[60] Continuation-in-part of Ser. No. 883,381, Mar. 6, 1978, Pat. No. 4,164,550, and Ser. No. 951,804, Oct. 16, 1978, abandoned, which is a continuation of Ser. No. 767,175, Feb. 9, 1977, abandoned, which is a division of Ser. No. 683,756, May 6, 1976, abandoned, said Ser. No. 951,804, is a continuation-in-part of Ser. No. 812,319, Jul. 1, 1977, Pat. No. 4,110,422, which is a continuation-in-part of Ser. No. 683,756, May 6, 1976, abandoned, said Ser. No. 883,381, is a continuation-in-part of Ser. No. 812,319, Jul. 1, 1977, Pat. No. 4,110,422.

[51] Int. Cl.³ .............................................. C01B 25/16
[52] U.S. Cl. ................................. 423/317; 423/321 R

[58] Field of Search ..................... 423/317, 320, 32

[56] References Cited

U.S. PATENT DOCUMENTS

| 2,936,888 | 5/1960 | Williams | 423/321 1 |
| 3,528,771 | 9/1970 | Shearon et al. | 423/ |
| 4,048,289 | 9/1977 | Pierres | 423/321 1 |
| 4,110,422 | 8/1978 | Hill | 423/ |
| 4,164,550 | 8/1979 | Hill | 423/32 |

FOREIGN PATENT DOCUMENTS

| 1020015 | 2/1966 | United Kingdom | 423/32 |
| 1023345 | 3/1966 | United Kingdom | 423/32 |

Primary Examiner—O. R. Vertiz
Assistant Examiner—Gregory A. Heller
Attorney, Agent, or Firm—Charles L. Harness

[57] ABSTRACT

This invention is directed to improvements in mak wet process phosphoric acid substantially free fr post-precipitation. The improvements include recycl to the reaction train a side stream produced by process; cooling one or more of the streams of the p cess; and/or addition of sulfuric acid to an evapora 21 Claims, 1 Drawing Figure

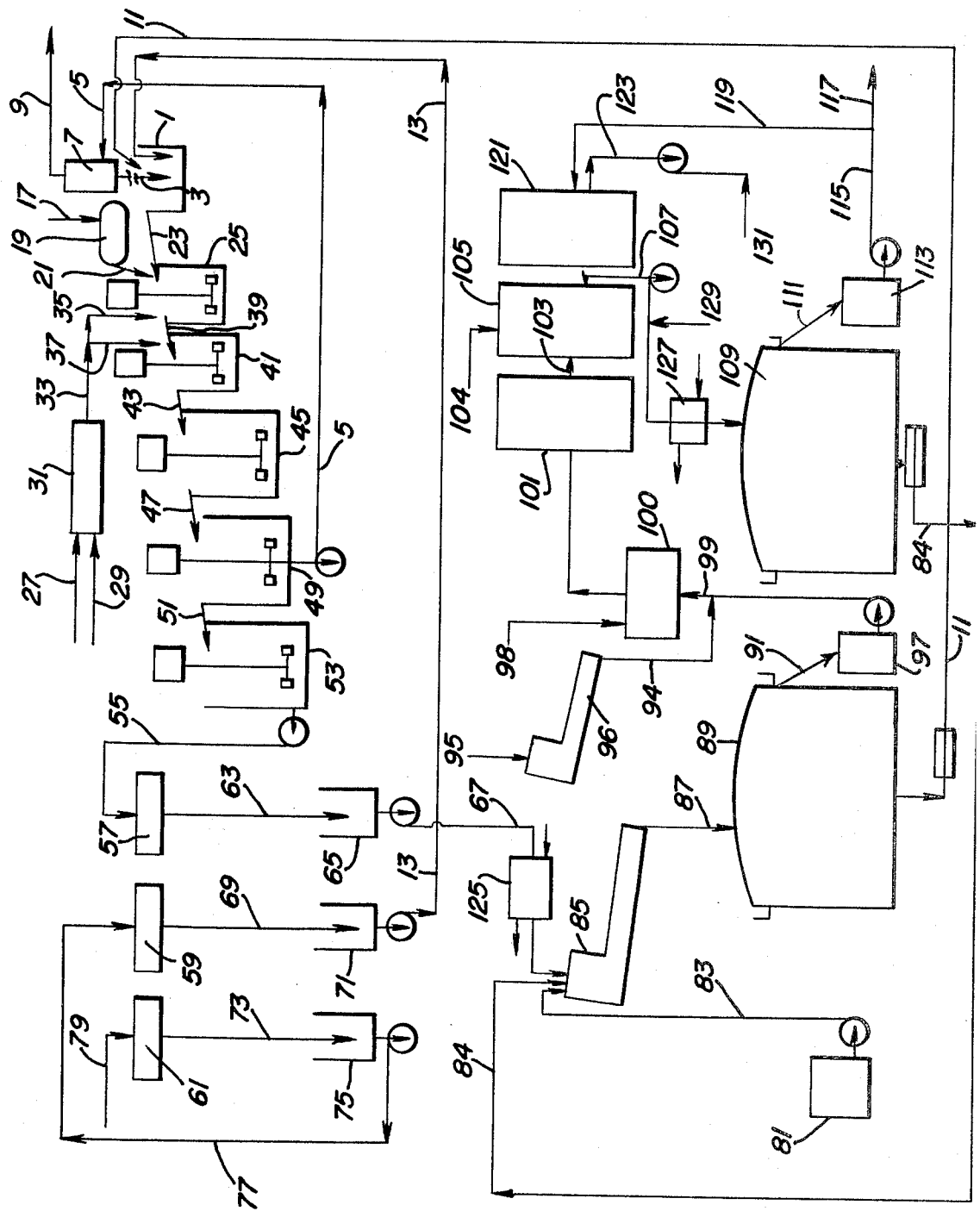

PRODUCTION OF STABILIZED WET PROCESS PHOSPHORIC ACID

This is a continuation-in-part of my copending application Ser. No. 951,804, filed Oct. 16, 1978, now abandoned which is a continuation of my Ser. No. 767,175 filed Feb. 9, 1977, now abandoned, which is a division of my Ser. No. 683,756 filed May 6, 1976, now abandoned. Ser. No. 951,804 is also a continuation-in-part of my application Ser. No. 812,319, filed July 1, 1977, now U.S. Pat. No. 4,110,422, which is a continuation-in-part of said application Ser. No. 683,756. This is also a continuation-in-part of my copending application Ser. No. 883,381, filed Mar. 6, 1978, now U.S. Pat. No. 4,164,550, which is a continuation-in-part of Ser. No. 812,319, aforesaid. A related case is my copending application Ser. No. 54,449, filed July 3, 1979, Docket 5588, "Improved Production of Stabilized Wet Process Phosphoric Acid". The aforesaid Ser. No. 951,804, 883,381, and 54,449 (Docket 5588); and U.S. Pat. No. 4,110,422 are each herein incorporated by reference in their entireties.

This invention is directed to improvements in the process of preparing a merchant grade wet process phosphoric acid with good post-precipitation control. In one aspect the improvement involves recycling back into the reaction train a side stream which is produced in the process.

Another improvement contemplated in the process is cooling certain of the streams in the process to cause additional precipitation of solids, thereby permitting removal of additional solids in the operation of the process.

Still another improvement is the addition of sulfuric acid to an evaporator (apparatus used in the process) to improve post-precipitation control when high iron and alumina rock is used as feed.

The basic process (herein, the "Basic Process") of which this invention is an improvement or improvements is described in my U.S. Pat. No. 4,110,422, and also in my copending U.S. applications Ser. Nos. 951,804, filed Oct. 16, 1978 and 883,381, filed Mar. 6, 1978. A related application is Ser. No. 54,449, filed July 3, 1979, for "Stabilized Wet Process Phosphoric Acid", Docket 5588. The entire disclosures of said patent and said applications are incorporated herein by reference.

The Basic Process includes several essential steps. A dilute phosphoric acid analyzing 22-46% $P_2O_5$ is thoroughly clarified to the extent feasible. Then aluminum silicate is added thereto in an amount of about 1 to 40 pounds of aluminum silicate per ton of equivalent $P_2O_5$ in the acid. The aluminum silicate is preferably perlite. The acid is then concentrated, typically up to about 45-52% $P_2O_5$, and is then sent to a crystallizing zone, where it is allowed to deposit crystals. The overflow stream, containing at most a small amount of crystals, can be taken as final product, or it can be further concentrated, e.g., up to 52-54% $P_2O_5$ for merchant grade acid or (preferably) up to 57-63% $P_2O_5$ to constitute the final product. The underflow stream from the crystallizer can be about 0.5-15 wt. % of the incoming feed to the crystallizer; preferably the range is 1-8%, and even more preferably it is 2-6%. Present commercial plant experience indicates 6% to be typical. This underflow stream contains in solution about the same percentage of $P_2O_5$ as in the feed to the crystallizer and about the same percentage of $P_2O_5$ as in the outgoing overflow stream. In addition it contains solids, and these soli may contain 10-45% $P_2O_5$, and 20-25% $P_2O_5$ is typic In view of the content of $P_2O_5$ in the underflo stream from the crystallizer, this stream should not wasted. This invention, inter alia, is directed to a pr cess for recovering this stream by returning it back the acid train.

By acid train is meant the entire series of steps f making wet process phosphoric acid that precede t formation of the crystals in the crystallizer, starti with the so-called "head box". Basically these ste include a mix tank wherein dilute sulfuric acid a phosphate rock are mixed. This reaction product pr ceeds to a digester where the reaction continues, a the digester effluent is filtered to provide a filter cake gypsum and a filtrate of dilute crude phosphoric aci This dilute acid proceeds to a clarifier, the underflow which is returned to the train, and the overflow is co centrated in stages to 40%, then to 50%, and then go to the crystallizer, and then is concentrated possibly 60%. (These percentages are approximate.) There a generally a number of intermediate operations. F example, there may be several mix tanks, one feedi into the other, as well as two or more digesters, wit effluent from one going into the other. The head bc above mentioned collects reaction product slurry take from one of the digesters and may also include unde flow from the clarifier and washings from the filterin operation. It is a preferred embodiment of this inventio that the crystallizer underflow be returned to the lau der mixer feeding to the clarifier. However, it may t returned to other unit operations of the train, includin the head box, a mix tank, a digester, or the feed lin going to the filter.

In another embodiment the final filtrate product fro the filter operation is cooled before it is clarified. Th decreases the solubility of the saturated component thereby precipitating them, and causing them to b caught in the clarifier. In another, similar, operatio after the aluminum silicate-containing acid is concer trated, it is cooled before it is sent to the crystallize settler. Each of these two cooling operations can b used alone, or in combination with each other, or i combination with the return of the underflow from th crystallizer back to the acid train. Preferably all thre embodiments are used together. Also, they can be use singly or in any permutation with the improvemen involving sulfuric acid addition above referenced When high iron and aluminum rock is used as feed, al four embodiments are preferably used together. Eacl cooling operation can be carried out at 40-60° C., pref erably 50-55° C.

Reference is made to the drawing which is a diagram matical flow sheet of a large scale plant utilizing th process of the instant invention. Much of the overal process is conventional. At 1 is shown the head box This is the initial vessel for receipt of several streams One such stream is stream 3, from flash cooler 7, whicl receives recycled slurry via line 5 from the second di gester 49. A vacuum line 9 maintains a reduced pressur on the flash cooler. Line 11 feeding into the head box is from clarifier 89, further described below. Line 13 i return acid from the No. 2 filtrate, also described below Proceeding now with the basic operation of the we process phosphoric acid plant, phosphate rock is fed vi line 17 into rock feeder 19, from which rock exit line 21 delivers metered amounts of phosphate rock into firs mix tank 25. Exit line 23 delivers liquid from the hea box 1 also into mix tank 25. Sulfuric acid via line 27 and water via line 29 are fed into dilution cooler 31, and this diluted sulfuric acid proceeds via line 33 to two branches, lines 35 and 37, each of which feeds respectively into a mix tank, line 35 feeding into mix tank 25 and line 37 into mix tank 41. The effluent from mix tank 25 exits via line 39 into mix tank 41, and the effluent from mix tank 41 exits via line 43 into first digester 45, from which exit line 47 feeds into second digester 49. Some of the slurry from digester 49 is returned via line 5 to head box 1 as already mentioned. The rest of the effluent from the second digester flow via line 51 into filter feed tank 53, from which the exits at line 55 into the prayon filter, shown here schematically in sections identified simply as 57, 59, and 61. Each section actually undergoes the steps of taking a first filtrate, followed by washing, followed by passing the wash water through a second operation, and the return of the resulting weak acid to the head box. These steps are further described as follows: Effluent line 55 from the filter feed tank proceeds to prayon filter 57, where it is filtered, and the No. 1 filtrate is delivered via line 63 into collection tank 65, from whence the effluent proceeds via line 67, to operations to be subsequently described. Wash water is fed via line 79 through the gypsum filter cake sitting on the filter leaf, as shown at 61, and the effluent waters pass via line 73 as No. 3 filtrate to collection vessel 75. The effluent line from vessel 75, line 77, containing the No. 3 filtrate, passes through another gypsum filter cake, at 59, and the washings are taken via line 69 to form No. 2 filtrate. The No. 2 filtrate is collected in vessel 71, and returned via line 13 to the said box 1 as already described. The filtration sequence is thus filtration through filter 57, which then becomes filter 59 and is washed with the No. 3 filtrate, following which filter No. 59 becomes filter 61, which is washed with plain wash water (typically pond water) to provide No. 3 filtrate used in the preceding step, which preceding step provides No. 2 filtrate which is returned to the head box. Returning now to line 67, No. 1 filtrate, this will proceed to launder mixer 85, where it is mixed with flocculation polymer, prepared as an aqueous solution in tank 81 and pumped via line 83 to the launder mixer. Line 84 carries underflow from crystallizer-settler 109 to launder mixer 85. The effluent line 87 from the launder mixer feeds to clarifier 89, which has overflow 91 and underflow 11. Overflow 91 feeds to a surge tank 97. Effluent from the surge tank 97 is pumped via line 99 to perlite addition tank 100. Perlite or other aluminum silicate is fed via line 95 to perlite feeder 96, which exits via line 94 to line 99. Sulfuric acid may also be added to mix tank 100 via line 98. Tank 100 (which is agitated) exits to a first evaporator (herein "E") 101. Here the acid is concentrated up to about 40% $P_2O_5$. Effluent proceeds via line 103 to a second evaporator (herein "F") 105, where it is concentrated up to about 48–52% $P_2O_5$. Line 104 may feed sulfuric acid into evaporator 105. Effluent line 107 takes the acid from evaporator 105 via line 107 to crystallizer-settler 109, which has overflow line 111 and underflow line 84. Overflow line 111 feeds to surge tank 113, and the effluent from the surge tank is taken by line 115 to branches 117 and 119. If the product is not to be concentrated further, commercial product can be taken out of line 117. If the product is to be concentrated further it is taken via line 119 to a third evaporator (herein "G") 121. Effluent line from evaporator 121, namely line 123, is the final product line. Concentration in evaporator 121 typically proceeds to a $P_2O_5$ content within the range of 52 to 63. Sulfuric acid line 129 may feed into line 107, for use with high iron and alumina rock, as elsewhere herein explained. Sulfuric acid may also be fed into the final product via line 131.

Crystallizer Underflow Return

The return of the crystallizer underflow to the acid train is one of the preferred embodiments of this invention.

My analyses from pilot plant work suggest that the solid product of the crystallizer is an undefined conglomerate, mostly of iron, calcium, and aluminum phosphates; calcium sulfate, and fluoride; and with minor amounts of insoluble complex phosphates and/or fluorides of sodium, potassium, strontium, titanium, and magnesium. This composition is suggested by the following typical analyses of solids taken from the pilot plant crystallizer underflow. As is evident, analyses for the same sample can vary considerably, depending on preparation, washing, etc.

One sample of crystallizer solids, immediately below, was centrifugally filtered. It was done this way in order to obtain a cake with a low content of liquid. The cake was removed and assayed "as is". This is sample No. 1. Part of this cake was also acetone washed and assayed without removing the excess acetone. This is sample No. 2. Data are in weight percent.

|  | No. 1 (As Is) | No. 2 (Acetone Washed) |
| --- | --- | --- |
| $P_2O_5$ | 46.50 | 41.00 |
| CaO | 3.51 | 3.90 |
| $SiO_2$ | 0.13 | 0.21 |
| $Fe_2O_3$ | 8.22 | 15.10 |
| $Al_2O_3$ | 1.02 | 3.35 |
| F | 1.23 | 2.04 |
| $H_2SO_4$ | 9.03 | 12.83 |
| MgO | 0.40 | 0.22 |
| $Na_2O$ | 0.63 | 1.03 |
| $K_2O$ | 0.73 | 0.78 |

Another sample was also centrifugally filtered, but this time washed with water while still being centrifuged. The cake was again divided, one sent to analysis "as is", the other acetone washed. These are Nos. 3 and 4 respectively.

|  | No. 3 (As Is) | No. 4 (Acetone Washed) |
| --- | --- | --- |
| $P_2O_5$ | 30.20 | 38.35 |
| CaO | 3.96 | 11.05 |
| $SiO_2$ | 0.02 | 0.03 |
| $Fe_2O_3$ | 9.62 | 15.25 |
| $Al_2O_3$ | 0.67 | 3.25 |
| F | 0.27 | 0.41 |
| $H_2SO_4$ | 13.51 | 17.16 |
| MgO | 0.03 | 0.02 |
| $Na_2O$ | 0.29 | 0.33 |
| $K_2O$ | 0.77 | 0.79 |

Another underflow sample was obtained which was an accumulation of the settled crystals over the 2nd and 3rd shifts on one day and the first part of the 1st shift on the following day. I sent to analysis a sample "as is" (No. 5) from the "head sample" above described.

|  | No. 5 Underflow As Is |
|---|---|
| $P_2O_5$ | 44.40 |
| CaO | 2.61 |
| $SiO_2$ | 1.90 |
| $Fe_2O_3$ | 3.39 |
| $Al_2O_3$ | 1.50 |
| F | 3.39 |
| $H_2SO_4$ | 7.94 |
| MgO | 0.59 |
| $Na_2O$ | 0.74 |
| $K_2O$ | 0.38 |
| Solids | 23.87 |

Four additional samples of about 400 cc each were centrifugally filtered. The first sample was centrifuged only, producing a cake and a filtrate. These are Nos. 6 and 7. The second was washed with 600 cc water only. The cake is No. 8 while the filtrate, which is now a mixture of the displaced acid and water, is No. 9. The next sample was washed with 400 cc acetone and the last with alcohol. These are identified at the head of each column (Nos. 10-13).

|  | No. 6 Cake As Is | No. 7 Filtrate (Acid Only) | No. 8 Water Washed Cake (Not Dried) | No. 9 Acid + Water |
|---|---|---|---|---|
| $P_2O_5$ | 33.75 | 47.50 | 24.75 | 28.80 |
| CaO | 8.46 | 0.17 | 10.04 | 0.23 |
| $SiO_2$ | 0.95 | 0.12 | 5.17 | 0.29 |
| $FE_2O_3$ | 6.75 | 1.16 | 8.30 | 0.61 |
| $Al_2O_3$ | 2.10 | 1.47 | 1.80 | 0.85 |
| F | 8.15 | 0.68 | 9.01 | 0.68 |
| $H_2SO_4$ | 1.39 | 4.30 | 1.52 | 2.90 |
| MgO | 0.58 | 0.59 | 0.51 | 0.40 |
| $Na_2O$ | 0.77 | 0.07 | 0.76 | 0.34 |
| $K_2O$ | 0.50 | 0.03 | 0.52 | 0.03 |

|  | No. 10 Cake (Acetone Washed-Vacuum Dried) | No. 11 Filtrate (Acid + Acetone) | No. 12 Cake (Alcohol Washed-Vacuum Dried) | No. 13 Filtrate (Acid + Alcohol) |
|---|---|---|---|---|
| $P_2O_5$ | 29.88 | 34.60 | 27.38 | 37.80 |
| CaO | 11.77 | 0.08 | 12.81 | 0.06 |
| $SiO_2$ | 6.02 | 0.12 | 6.93 | 0.00 |
| $Fe_2O_3$ | 10.05 | 0.76 | 10.75 | 0.80 |
| $Al_2O_3$ | 0.43 | 0.96 | 1.65 | 1.08 |
| F | 9.47 | 0.46 | 10.78 | 0.49 |
| $H_2SO_4$ | 19.31 | 3.00 | 20.56 | 3.30 |
| MgO | 0.65 | 0.45 | 1.61 | 0.48 |
| $Na_2O$ | 0.13 | 0.06 | 0.78 | 0.04 |
| $K_2O$ | 0.14 | 0.02 | 0.53 | 0.02 |

As above noted, in a preferred embodiment the crystallizer underflow (line 84) is returned to the launder-mixer 85, where it is mixed with flocculant and the No. 1 filtrate, for feeding to the clarifier 89. There are, however, other effective places upstream in the train where the underflow can be added, namely, to the head box 1, where it is mixed with recycled reaction slurry and filtrate washings; and/or to the filter feed tank 53. Also, the stream can be divided, for return to two or more of those positions.

When the underflow from the crystallizer-settler 109 is returned to the clarifier 89, e.g., via launder mixer 85, or to the stilling well of the clarifier, I prefer to add flocculant polymer, suitably Polyhall M295, at the rate of 0.1% by weight in water, then add the solution to mixing launder 85 with the acid (line 67) at 1% by v ume of the acid. The polymer should be completely solution before it is used. I also prefer to add a 5( NaOH solution into the launder, at the rate of about pounds of 100% NaOH per ton of $P_2O_5$ in the ac These embodiments greatly improve the quality of clarifier overflow 91.

In an alternate preferred embodiment, which wo as well as or better than returning the crystallizer-sett underflow to the clarifier launder-mixer 85, the und flow from the crystallizer-settler is pumped to the s ling well in the clarifier. The strong underflow acic displaced from the crystallizer-settler underflow sol with 28% acid and these solids, comingled with solids from the solids from the clarifier, are pumped clarifier underflow to the digestion circuit (line 11).

Since the liquid portion of the crystallizer underfl return is about 50% $P_2O_5$ acid, this serves to raise $P_2O_5$ in the clarifier, e.g., in the overflow, to about 30

By this method I have eliminated "in plant" slud Also by this method I do not lose evaporative capac which occurs when the crystallizer-settler underflov returned to digestion directly.

It is best to have the concentration of crystallizer-s tler solids as high as possible and still be fluid enough pump. The underflow from the crystallizer-settler been as high as 35% solids by wt., but a better operat range is 20 to 25% by wt. The underflow from clarifier has been as high as 45%, but about 30 to 3: by wt. is more easily handled. It does no harm to pu lower solids content; this merely increases the a recycle.

In commercial scale performance, the initial rout of crystallizer underflow (line 84) to clarifier 89 launder 85 resulted in an increase in solids in clarii overflow (from 0.1% to 0.5% solids). It was anticipa that this change might also result in higher solids in "F" evaporator product (line 107), the crystallizer ov flow (line 111) and the "G" evaporator product (l 123). However, each of these three latter lines actuz showed a decrease in solids. The reasons were not cl« possibly the decrease was not related to passing crystallizer underflow to the clarifier, since at the sa time addition of a descaler (to descale the evapora tubes) was discontinued. With continued eliminatior the descaler, solids in the 3 indicated lines began increase and eventually attained expected but acce able levels (typically 1.0–1.4%). Thus, overall, no de rioration in performance was detected by reason returning crystallizer underflow to the clarifier, and benefit of the change, i.e., making the circuit integral consuming a by-product line, was readily achieved. 1 final product resulting from the return is apparer indistinguishable from the product resulting from process without the crystallizer underflow return.

The crystallizer-settler 109 used in the commer< application of my invention had an overall diametei 35 feet by 20 feet high, with a total volume of ab 144,000 gallons. With an acid feed rate of 46 GPM total displacement time is about 2.13 days. At 61 G] this becomes 1.64 days. The bottom of the crystalli within the settler is 16'-4" below the surface of the ac This is the point at which the incoming acid leaves crystallizer and starts its upward journey through settler to the outlets. This volume, which I refer tc the active volume, is approximately 117,000 gallons c ention time at 47 GPM of 1.73 days compared to 1.33 ys at 61 GPM. The additional aging at the lower rate ty be helpful, particularly if the operator skips from e rock blend to another at odd times. Three to 4 days ing may be beneficial. Some rock blends produce acid it do much better in the crystallizer-settler if cooled st. Bench scale tests show that if the acid is cooled to out 35 to 40° C. the small amount of light brown lids that settle after 4 to 5 days in the final product can dramatically reduced.

Lab tests have also shown that $P_2O_5$ concentration to e crystallizer-settler can influence the quality of un- rflow. Lower $P_2O_5$ to the crystallizer-settler, i.e., 47 48% produces less iron whereas if the $P_2O_5$ is in- eased to 50% the iron in the underflow increases.

As already indicated, aluminum silicate (preferably rlite) acts as an aid to crystal growth and formation, using more rapid settling in the crystallizer-settler 9.

Cooling the Acid

Cooling the acid as herein described is another pre- red embodiment of the invention.

It is of advantage to cool (e.g., to down to 35-60° C., preferably, 50-55° C.) the dilute phosphoric acid feed the clarifier and/or feed to the crystallizer settler. In ch instance additional solids are precipitated for re- very and removal from the system. These additional lids are believed to be mostly calcium sulfate and dium potassium, and calcium silicofluoride. This em- diment can be used with or without the return of the ystallizer underflow upstream to the train. However, eferably this embodiment is used with crystallizer derflow return.

Sulfuric Acid Addition to the Crystallizer

This is a preferred embodiment of the invention and is rticularly useful when the reaction train uses phos- iate rock high in iron and aluminum ("high I and A"). ich rock may analyze typically

|  | Wt. % |
|---|---|
| $P_2O_5$ | 32.4 |
| CaO | 46.2 |
| $SiO_2$ | 5.3 |
| $Fe_2O_3$ | 1.59 |
| $Al_2O_3$ | 1.44 |
| F | 3.47 |
| $H_2SO_4$ | 1.6 |
| MgO | 0.32 |
| $Na_2O$ | 0.49 |
| $K_2O$ | 0.06 |
| $SO_3$ | 1.28 |

Rock in which the ratio of $Fe_2O_3$ plus $Al_2O_3$ to $P_2O_5$ ceeds 0.08 is considered "high I and A" rock. Thus, in e above rock, $(Fe_2O_3)+Al_2O_3)/P_2O_5=(1.59+1.44)/32.4=0.094$, which puts it in the tegory of "high I and A" rock.

The Basic Process as described in my U.S. Pat. No. 110,422 as applied to high I and A rock can be consid- ably improved if the sulfate content in the crystallizer fluent is maintained at 6-15% of the $P_2O_5$ content of e acid exiting the crystallizer. If sulfate measured as $_2SO_4$) is below this level, it can be brought up by lding sulfuric acid to the crystallizer, e.g., by line 129. ich sulfuric acid is suitably 93% concentration. The nount to be added is determined by the sulfate content id volume of the incoming stream (line 107), the sul- fate analysis desired in the crystallizer overflow, and the acid concentration in line 129. In this embodiment, 6-10% is preferred, and about 8% is more preferred.

Some experimentation may be desirable as regards a given phosphate rock to determine the minimum amount of perlite or other aluminum silicate that can be used. The rock used in the process described in my U.S. Pat. No. 4,110,422 was known as "Bonny Lake" rock, a local Florida rock. Phosphoric acid made from Bonny Lake rock ordinarily requires only about 4-6 pounds of perlite/ton $P_2O_5$, and $H_2SO_4$ adjustment is not neces- sary. The "high I and A" rock above reported is from the so-called "Hookers Prairie" area (another Florida rock) and phosphoric acid from Hookers Prairie rock typically requires 12-16 lb. perlite/ton $P_2O_5$ in the acid, plus preferably $H_2SO_4$ adjustment upward to about 8% as aforesaid, based on $P_2O_5$ in the acid. While the reason the addition of sulfuric acid helps control post-precipi- tation is not entirely clear, there is evidence to the effect that it may help prevent crystallization of iron hydro- gen phosphate and its analog aluminum hydrogen phos- phate. The higher perlite requirement for acid from Hookers Prairie rock may also be associated with an arbitrarily shorter residence time in the crystallizer-set- tler 109. By way of comparison, Bonny Lake rock was run at 38-40 tons of rock one hour through the train described in the drawing, versus 44 tons/hour for Hookers Prairie rock. Accordingly it would appear that the higher perlite requirement for Hookers Prairie rock may be related to lessened residence in the crystallizer- settler.

The products made by the herein described improve- ments are about the same as those made by the Basic Process, as described in my applications and patent above referenced, and for a detailed description of those products reference is made thereto.

By way of summary, the following may be men- tioned.

The products of this invention, e.g., those in Table A, are characterized by the following features: (a) such solids as exist are suspended and nearly non-settling; (b) such solids as exist are soft, free flowing, and non-cak- ing; (c) the solids-containing acid is readily pumped from storage and does not form a cake over outlets, valves, and accessory mechanisms; (d) the acid can be ammoniated without substantial foaming. The above criteria apply to acids of this invention in lab samples and/or shipped and stored in conventional equipment and for normal use times, e.g., in tank cars, typically of 200,000 lbs.

In the specification and claims all percentages are by weight unless otherwise stated.

TABLE A

| | Some Products of This Invention | | |
|---|---|---|---|
| | "High $P_2O_5$" Acid Wt. % | "Low $P_2O_5$" Acid Wt. % | Low-high range, Wt. % |
| Component | | | |
| $P_2O_5$ | 58-61 | 52-55 | 52-63 |
| Solids | 0-2 | 0.5-3 | 0-3 |
| $SO_4$ as $H_2SO_4$ | 3.5-5 | 2.5-5.5 | 2.5-6.0 |
| CaO | 0.05-1 | 0.09-0.4 | 0-1.2 |
| $SiO_2$ | 0.02-0.15 | 0.03-0.25 | 0-0.25 |
| F | 0.5-1.5 | 0.9-1.3 | .35-1.5 |
| $Fe_2O_3$ | 1.1-2 | 1-3 | .5-3 |
| $Al_2O_3$ | 1.1-2 | 1-3 | .5-3 |
| $Na_2O$ | 0.025-0.15 | .04-0.09 | .02-0.2 |
| $K_2O$ | 0.025-0.15 | 0.01-0.12 | 0.01-0.2 |
| MgO | 0.5-0.65 | 0.35-0.6 | 0.3-0.7 |
| Sum of CaO, $SiO_2$, | | | |

TABLE A-continued

| | Some Products of This Invention | | |
|---|---|---|---|
| Component | "High P$_2$O$_5$" Acid Wt. % | "Low P$_2$O$_5$" Acid Wt. % | Low-high range, Wt. % |
| F, Na$_2$O, K$_2$O, and MgO | 1.1–3.6 | 1.4–2.8 | 0.7–4 |

The problem of post precipitation in prior art 52–54% P$_2$O$_5$ merchant grade acid is bad enough; it is impossible with prior art 60% acid, as the post precipitation in such 60% acid is even worse, and for that reason (prior to my invention of the Basic Process) 60% merchant grade acid was not ordinarily available commercially for shipment over any considerable distance or storage for any substantial time.

The tank car cleaning problem with prior art sludge is particularly aggravated in that harsh measures (scraping, chipping) tend to penetrate the rubber lining of the car. This cleaning "fact of life" necessitates great caution and prolonged cleaning times.

Aside from the augmented post-precipitation problems of an ordinary 60% P$_2$O$_5$ merchant grade acid, such product is technically very difficult to make using prior art 50% P$_2$O$_5$ feed acid. The latter tends to boil and entrain in the 60% evaporator. This behavior is quite aside from its post precipitation problems. On the other hand, my 50% product from line 111 from crystallizer 109 is readily concentrated in the "G" evaporator 121, to 57–63% without boiling or entraining.

In a series of runs during the initial operation of a 70,000 ton/year wet process phosphoric acid plant using the Basic Process, extending over a period of a little over two months, 47 daily samples were taken from "G" evaporator product (line 123), and analyzed for P$_2$O$_5$ and solids (inter alia). The average (mean) of the 47 runs was 59.72% P$_2$O$_5$. A particularly suitable P$_2$O$_5$ range was 59–61%. The values above 61% were 5 runs at 61.5% and one run at 62%. There were 10 runs below 59% namely two at 56, one at 56.5, two at 57, one at 57.5, three at 58, and one at 58.5. The average (mean) of the 47 runs was 1.3% solids. The three lowest values were 0.5, 0.5, and 0.6%. The three highest values were 2.1, 2.2, and 5%. Sampling and/or analytical errors may have been involved in the 5% report. A range of about 0.8–1.8% solids was typical for a P$_2$O$_5$ range of 59–61%. During the later months of operation, after the plant achieved optimum performance under preferred conditions, as hereinafter described, solids for 58–60% P$_2$O$_5$ acid dropped to an average of about 0.14 wt. %, with a range of 0–1.1 wt %.

The P$_2$O$_5$ in the final product can be controlled with a fair degree of precision, simply by evaporating more or less water from the product in the final concentration stage. The exact amount of solids and of other components is a consequence of all the preceding steps in the process, and cannot be predetermined with certainty. These values will, however, normally and inherently fall within the ranges here stated, if the process is operated as herein described. For example, the operator cannot "aim" specifically at a product with exactly 0.14% solids. However, proper operation of the process as described will in general result in a product carrying solids of about 0–2%, so that his desired solids percentage will not be far from his actual result.

The reason why the suspended solids do not readily settle out (as they do in ordinary 52–54% P$_2$O$_5$ merchant grade acid) is not entirely clear. One reason is apparently that the solid particles in my product a unusually small, being an estimated 5 microns. Al: they are of relatively low density (about 2). These fa tors contribute to their enduring suspension, especia. in 57–63% acid (density about 1.8).

The advantages of the phosphoric acid products the Basic Process and of this invention may be demo strated with respect to their behavior on shipment standard phosphoric acid tank cars. These tank ca slope gently from the ends toward the center, to a sum to which is attached a discharge pipe, closed by a d mountable flange, and equipped with a valve. The ta car is equipped with a dip tube which is closed by flange; the car has a rupture diaphragm, a man ho access, and various convenience equipment includii ladder, and hand rail. The flange can be removed f unloading.

Phosphoric acid is corrosive, and will corrode t] tank car unless the latter is protected by a coating. Co ventionally this coating is a rubber lining, ¼ inch thic The coating covers the interior of the tank car. When tank car of ordinary wet process merchant grade pho phoric acid is shipped, it begins to lay down a deposit sludge. Owing to the motion of the car, the layer ten to deposit not only on the bottom of the car but also w coat the front and rear ends, as well as the sides. Th layer can become quite thick, e.g., up to 36 inches aggravated cases.

In shipping ordinary merchant grade acid, slud$ tends to collect in the sump and the exit pipe, and to fo the valve. This is in addition to settling on the botto and sides of the tank car as already described. Th fouling gives an immediate problem on attempting empty the car via the discharge pipe. Since the cake sludge around the exit equipment first has to be broke up. This work typically requires one to two hours. Eve after the initial clearances have been made, addition pieces of sludge and cake might flow into the valve ar exit pipe, slowing or blocking flow of the acid.

There are two ways to remove acid from a tank ca One way is through the sump out the bottom, as alread described. The other way is through the dip tube. ] order to manage this the cover flange is removed, conduit is attached, and compressed air is blown ii Again, this procedure requires that the dip tube term nus at the bottom of the tank car be free of cake. If it not free, it has to be made free. This may be accon plished by the use of an air lance. If that doesn't worl the dip tube may have to be pulled out. These proce dures are time-consuming and frustrating.

Neither of the two aforesaid procedures for drainin prior art acid from a tank car are effective for removin the layer of sludge deposited on the bottom and sides b ordinary merchant acid. This layer is a hard cake i most cases, and cannot be flushed out easily. Men hav to enter the tank car physically with cleaning equip ment to dislodge this cake. Aside from the time, effoi and inconvenience involved in cleaning out the cak( following removal of the acid from the tank car, there a severe economic loss represented by the amount c cake that is left. Prior art merchant grade acid typicall deposited 5 to 10% of its P$_2$O$_5$ content as sludge, whic caked up in the car and was unavailable to deliver to th customer, since the customer pays only for the aci pumped from the car. The cake that is left is for th account of and is the responsibility of the seller. Sinc phosphoric acid may sell at $250.00 per ton of P$_2$O$_5$, i evident that the loss per tank car might run $500.00 to 1000.00. This loss is doubly unfortunate, since the sludge has value by reason of its $P_2O_5$ content.

The instant products (especially the 58-63% $P_2O_5$ products) differ from the prior art products inter alia in their freedom from depositing cake and sludge that prevent recovery of solids. By way of contrast with prior art wet process acids, the acids of this invention can be pumped instantly from tank cars, even after the cars have been in transit or in storage for several weeks. My products do not clog valves or exit lines, and do not substantially settle out in transit and/or storage. The small amount of sediment that does deposit is not of a caking type, and is readily washed out. Practically all solids in my products that are in the products when made and shipped out from the commercial phosphoric acid plant stay suspended in the acid during transit and/or storage and become thus available to the customer. This is, of course, advantageous to the customer, who has the advantage of the $P_2O_5$ content of the small amount of suspended solids in my products, and it is likewise economically advantageous to the manufacturer, who does not have to absorb the loss of sludge unrecoverable and unsaleable at the point of destination.

A certain small amount of solids can be tolerated in merchant grade phosphoric acid prepared in accordance with my invention without causing any problem in post precipitation. For example, acid made by my process may on occasion show a solid content as high as 3% in the finished acid as shipped, analyzing 52 to 63% $P_2O_5$. However, my pre-treatment operations to prevent post precipitation have the result that most of these solids stay in suspension in the acid. For example, as the acid sits in a tank car for weeks on end, only minimal amounts of solids precipitate. Even these minimal amounts do not drop out as sludge, but rather as a thin covering on the rubber lining of the tank car, readily removed when the car is pumped out.

Unloading a tank car of normal merchant grade phosphoric acid usually requires a considerable period of time just getting the acid to flow. Sludge deposits over unloading valve act like a plug and must be broken through. Operators will hook air to the valve and blow out the plug if possible. An air lance, down the dip pipe, is used sometimes to clear the valve. With evaporator product it has been necessary to drive a bar up through the valve to get flow started. It is not unusual to spend two hours getting the flow started. If the car has not been cleaned on the last couple of trips, sludge can stop flow and the procedure must be redone. Time required to start flow ranges from thirty minutes to two hours. After flow is started, pumping requires two hours minimum. Washing of cars requires about thirty minutes to set up and four to sixteen hours to wash sludge from cars. Some cars will have four feet of solids in the ends and this is very difficult to remove. The sludge is hard and comes loose in chunks that must be broken up by the acid jet. It is a difficult and time consuming job.

In contrast, acid prepared in accordance with the Basic Process and by this invention (especially 58-63% $P_2O_5$) flows as soon as bottom car valve is open. No lance, air blow or rodding is required. Pumping time has averaged one hour and twenty minutes per car. Cars carrying such acid have required only a simple rinse to remove the inch (approximate) of solids in cars. The preparation time for wash is still required but the actual wash is very small.

Analytical

Except for solids and iron, analyses were made by procedures in "Methods Used and Adopted by the Association of Florida Phosphate Chemists", Fifth Ed., 1970 ("AFPC"). Where more than one method is provided, the selections were as follows:

P, Photometric method (phosphate rock), p. 80.
Aluminum oxide, Atomic absorption method, p. 95.
F, Specific ion electrode method, p. 104A.
Water, Karl Fischer method, p. 127.
Phosphoric acid in phosphoric acid, Total phosphoric acid method, p. 132.

Solids were determined by the following procedure:

Apparatus a. Vacuum filtration system
b. Drying oven adjusted to 105° C.
c. Gooch crucible, porcelain, with perforated bottom Reagents a. Asbestos—Powminco brand or equivalent, special for Gooch crucibles, acid washed. This grade asbestos as received should be thick slurried with water and blended in a Waring blender or equivalent for 10 seconds. The blended slurry should then be placed in an Erlenmeyer flask and washed 3-5 times by adding distilled water and decanting to remove the extremely fine material. The washing is accomplished by thoroughly shaking the blended asbestos with each water wash and then allowing it to settle for 5-10 minutes before decantation of the excess water and fine material.
b. Methanol, absolute Determination Prepare the Gooch crucible with a pad of asbestos which filters freely under medium suction. (In lieu of asbestos, glass fibers can be used.) Pad should be thick enough to retain all suspended solids. Wash pad several times with distilled water, finally with methanol, and place in drying oven at 105° C. for a minimum of one hour. Remove from drying oven and place in desiccator until cool. Reject or rework crucibles which visually show evidence of pad separation from crucible walls. Weigh crucible rapidly and record tare weight. Resuspend solids in sample by shaking thoroughly. Immediately weigh approximately five-ten grams of sample, accurately weighed, into the crucible. Place the crucible and contents on a filter flask and filter with strong vacuum until all of the liquid portion has been filtered through. Wash the solids five times with five ml portions of methanol allowing each wash to filter through completely. Remove crucible from suction and place in the drying oven at 105° C. for a minimum of one hour. Cool in desiccator and weigh rapidly as soon as cool.

$$\% \text{ Suspended Solids} = \frac{\text{Weight of Residue}}{\text{Weight of Sample}} \times 100$$

In these analyses, samples are well shaken, then immediately analyzed. Thus, values for $P_2O_5$, lime, silica, iron, alumina, etc. include components in both liquid and solid phases.

Ferrous and ferric iron were determined by the following procedure:

Reagents a. Standard Potassium Dichromate

A 0.1 N solution is made by dissolving 4.904 grams and diluting to one liter with distilled water.

b. Stannous Chloride

Sixty grams of the crystallized salt is dissolved in 600 ml of concentrated HCl and made up to 1 liter with distilled water.

c. Phosphoric Acid—Sulfuric Acid Mixture 150 ml concentrated $H_2SO_4$ and 150 ml concentrated $H_3PO_4$ are diluted to 1 liter with distilled water.

d. Mercuric Chloride

A saturated solution of $HgCl_2$ (60–70 grams per liter) is made.

e. Diphenylamine

One gram of diphenylamine is dissolved in 100 ml of $H_2SO_4$.

Determination

A 5.00 gram sample of acid is weighed into a 250 ml beaker. About 100 ml of distilled water is added to the beaker. Then 15 ml of the phosphoric-sulfuric acid mixture and 4 drops of diphenylamine are added. The solution is stirred and potassium dichromate is added drop by drop until a deep purple color develops. The milliliters of potassium dichromate is recorded and used in the calculation for ferrous iron. A total iron is run by weighing out 5.00 grams into a 250 ml beaker, adding 25 ml of 1:1 HCl and about one ml of 2% potassium permanganate solution, placing this on the hot plate and boiling until the color of permanganate is destroyed. The iron is then reduced by adding stannous chloride drop by drop until the solution is colorless. Add one–two drops in excess. The solution is allowed to cool to room temperature. The solution is diluted to 100 ml and 15 ml saturated mercuric chloride is added. Add 15 ml of phosphoric-sulfuric acid mixture and 4 drops of diphenylamine indicator. Potassium dichromate is added drop by drop to the stirred solution until a deep purple end point develops.

Calculation:

$$\% \text{ Ferrous Iron} = \frac{\text{ml Titration for Ferrous}}{\text{wt. of sample}} \times .005585 \times 100$$

$$\% \text{ Total Iron} = \frac{\text{ml Titration for total}}{\text{wt. of sample}} \times .005585 \times 100$$

% Ferric Iron = % Total Iron − % Ferrous Iron

Preferred embodiments for operating the commercial plant above described (cf. the drawing) include:

(1) using a 50/50 mix of Hookers Prairie (so-called) (HP) phosphate rock and Bonny Lake (BL) rock (from the Central Florida area). The analyses of these two rocks are typically:

|  | HP | BL |
|---|---|---|
| $P_2O_5$, wt % | 32.4 | 31.40 |
| CaO | 46.2 | 47.3 |
| $SiO_2$ | 5.3 | 8.56 |
| $Fe_2O_3$ | 1.59 | 0.89 |
| $Al_2O_3$ | 1.44 | 0.90 |
| F | 3.47 | 3.57 |
| $SO_4$ as $H_2SO_4$ | 1.6 | 0.73 |
| MgO | 0.32 | 0.33 |
| $Na_2O$ | 0.49 | 0.59 |
| $K_2O$ | 0.06 | 0.35 |

(2) Perlite use, at the rate 16 lb./ton of $P_2O_5$ in the crude acid at the perlite addition vessel.

(3) NaOH addition to clarifier, at the rate of 3 lbs. ($Na_2O$ equivalent) per ton of $P_2O_5$ in the crude acid in the clarifier. (NaOH is preferred to $Na_2CO_3$ for addit to the clarifier.)

(4) Sulfuric acid addition to crude phosphoric a stream to first evaporator, at the rate of 8% $H_2S$ based on the weight of $P_2O_5$ of the phosphoric acid this point.

(5) Fe in the rock feed comprises mostly ferric with possibly some ferrous Fe. The ferrous/ferric r; may appear in the acid (No. 1 filtrate) going to clarifier as Ferrous Fe, 1.69 g./liter Ferric Fe, 8.35 g./liter Using the above preferred conditions, a series of consecutive runs was carried out (per the drawing) make 58% $P_2O_5$ acid. The average (mean) solids in 1 series was 0.14%, with a range of 0% to 1.1%. Sol were measured on samples taken from a tank receiv effluent from line 193, FIG. 4. The tank had a capac equivalent to five days normal production (at 70,( tons/year), i.e., about 21 tank cars. However, owing rapid turnover, it generally carried only about four t; cars.

I claim:

1. In the process of preparing wet process phospho acid with low post-precipitation characteristics in acid train, comprising preparing dilute phosphoric a by reaction of sulfuric acid and phosphate rock i reaction zone to form a reaction slurry, filtering reaction slurry in a filtration zone to provide a filte acid, clarifying the filtered acid in a clarification zc adding aluminum silicate to the clarified acid, conc trating the acid to about 45–52% $P_2O_5$, and passing concentrated acid to a crystallizing zone to provid product stream and a stream containing most of crystals produced in the crystallizing zone, said crys analyzing 10–45% $P_2O_5$ and being mostly phospha the improvement comprising returning the said cr tals-containing stream to the acid train.

2. Method according to claim 1, in which the cr tals-containing stream is admixed with the dilute a prior to clarification.

3. Method according to claim 1 in which the cryst containing stream is returned to the reaction zone.

4. Method according to claim 3 in which the cryst containing stream is mixed with recycled react slurry and filtration washings before passing it to reaction zone.

5. Method according to claim 1 in which the cryst containing stream is returned to the filtration zone.

6. In the process of preparing wet process phospho acid with low post-precipitation characteristics in acid train, comprising preparing dilute phosphoric a by reaction of sulfuric acid and phosphate rock i reaction zone to form a reaction slurry, filtering reaction slurry in a filtration zone to provide a filte acid, clarifying the filtered acid, adding aluminum : cate to the clarified acid, concentrating the acid about 45–52% $P_2O_5$, and passing the concentrated a to a crystallizing zone to provide a product stream ; a stream containing most of the crystals produced in crystallizing zone, said crystals analyzing 10–45% P; and being mostly phosphates; the improvement cc prising cooling the filtered acid to a temperature in range of 35°–60° C. before clarifying it.

7. Process according to claim 6 in which the filtered acid is cooled to a temperature in the range of 50°–55° C.

8. In the process of preparing wet process phosphoric acid with low post-precipitation characteristics in an acid train, comprising preparing dilute phosphoric acid by reaction of sulfuric acid and phosphate rock in a reaction zone to form a reaction slurry, filtering the reaction slurry in a filtration zone to provide a filtered acid, clarifying the filtered acid, adding aluminum silicate to the clarified acid, concentrating the acid to about 45–52% $P_2O_5$ and passing the concentrated acid to a crystallizing zone to provide a product stream and a stream containing most of the crystals produced in the crystallizing zone, said crystals analyzing 10–45% $P_2O_5$ and being mostly phosphates; the improvement comprising cooling the concentrated acid to a temperature in the range of 40°–60° C. before passing it to the crystallizing zone.

9. Process according to claim 8 in which the improvement additionally comprises cooling the filtered acid to a temperature in the range of 35°–60° C. before clarifying it.

10. Process according to claim 8 or claim 9 in which the temperature is 50°–55° C.

11. In the process of preparing wet process phosphoric acid with low post-precipitation characteristics in an acid train, comprising preparing dilute phosphoric acid by reaction of sulfuric acid and phosphate rock in a reaction zone to form a reaction slurry, filtering the reaction slurry in a filtration zone to provide a filtered acid, clarifying the filtered acid, adding aluminum silicate to the clarified acid, concentrating the acid to about 45–52% $P_2O_5$, and passing the concentrated acid to a crystallizing zone to provide a product stream and a stream containing most of the crystals produced in the crystallizing zone, said crystals analyzing 10–45% $P_2O_5$ and being mostly phosphates; the improvement comprising (a) cooling the filtered acid to a temperature in the range of 35°–60° C. before clarifying it, and (b) returning the said crystals-containing stream to the acid train.

12. Process according to claim 11 in which the temperature range in (a) is 50°–55° C.

13. In the process of preparing wet process phosphoric acid with low post-precipitation characteristics in an acid train, comprising preparing dilute phosphoric acid by reaction of sulfuric acid and phosphate rock in a reaction zone to form a reaction slurry, filtering the reaction slurry in a filtration zone to provide a filtered acid, clarifying the filtered acid, adding aluminum silicate to the clarified acid, concentrating the acid to about 45–52% $P_2O_5$, and passing the concentrated acid to a crystallizing zone to provide a product stream and a stream containing most of the crystals produced in the crystallizing zone, said crystals analyzing 10–45% $P_2O_5$ and being mostly phosphates; the improvement comprising (a) cooling the concentrated acid to a temperature in the range of 35°–60° C. before passing it to the crystallizing zone, and (b) returning the said crystals-containing stream to the acid train.

14. Process according to claim 13 in which the temperature in (a) is 50°–55° C.

15. Process according to claim 13 in which the improvement additionally comprises cooling the filtered acid to a temperature in the range of 35°–60° C. before clarifying it.

16. Process according to claim 15 in which the filtered acid is cooled to 50°–55° C.

17. Process according to claim 6, 7, 8, 9, 10, 11, 12, 13, 14, 15, or 16, in which the crystals-containing stream is mixed with the dilute acid prior to clarification.

18. In the process of preparing wet process phosphoric acid with low post-precipitation characteristics in an acid train comprising preparing dilute phosphoric acid by reaction of sulfuric acid and phosphate rock high in iron and alumina in a reaction zone to form a reaction slurry, filtering the reaction slurry in a filtration zone to provide a filtered acid, clarifying the filtered acid, adding aluminum silicate to the clarified acid, concentrating the acid to about 45–52% $P_2O_5$, and passing the concentraed acid to a crystallizing zone to provide a product stream and a stream containing most of the crystals produced in the crystallizing zone, said crystals analyzing 10–45% $P_2O_5$ and being mostly phosphates; the improvement comprising adding sulfuric acid to the concentrated acid being passed to the crystallizing zone to raise the sulfate content of that acid up to about 6–15% of the $P_2O_5$.

19. Process according to claims 1, 2, 3, 4, 5, 6, 7, 8, 9, 10, 11, 12, 13, 14, 15, 16, or 17 in which the phosphate rock is high iron and aluminum rock and sulfuric acid is added to the concentrated acid being passed to the crystallizing zone to raise the sulfate content thereof up to about 8% of the $P_2O_5$.

20. Method according to claim 2 in which flocculant polymer is added to the clarifier as about a 0.1% by weight water solution, said solution being about 1% by volume of the phosphoric acid feed to the clarifier, together with an aqueous solution of sodium hydroxide at the rate of about 3.2 pounds NaOH, 100% basis, per ton of $P_2O_5$ in the acid.

21. Method according to claim 1 in which the crystals-containing stream is returned to the clarification zone.

* * * * *